United States Patent [19]

Sanda et al.

[11] 4,048,973
[45] Sept. 20, 1977

[54] INTERNAL COMBUSTION ENGINE PROVIDED WITH PRE-COMBUSTION CHAMBER

[75] Inventors: Shoogo Sanda, Okazaki; Norihiko Nakamura, Susono, both of Japan

[73] Assignee: Toyota Jidosha Kogyo Kabushiki Kaisha, Japan

[21] Appl. No.: 534,486

[22] Filed: Dec. 19, 1974

[30] Foreign Application Priority Data

Feb. 21, 1974  Japan .................................. 49-20102

[51] Int. Cl.² .................... F02B 23/00; F02B 75/02
[52] U.S. Cl. .................... 123/191 SP; 123/32 SP; 123/191 S
[58] Field of Search ............ 123/32 SP, 32 SA, 32 K, 123/32 ST, 191 S, 191 SP

[56] References Cited

U.S. PATENT DOCUMENTS

| | | | |
|---|---|---|---|
| 1,523,454 | 1/1925 | Shepherd | 123/191 SP |
| 1,719,705 | 7/1929 | Kondo | 123/191 S |
| 2,103,787 | 12/1937 | McCrary | 123/191 S |
| 2,173,081 | 9/1939 | Barkeij | 123/191 SP |
| 2,708,428 | 5/1955 | Fisher | 123/191 S |
| 2,711,723 | 6/1955 | Summers | 123/191 SP |
| 3,416,501 | 12/1968 | De Coye De Castelet | 123/32 SP |
| 3,776,212 | 12/1973 | Karlowitz | 123/32 SP X |
| 3,921,605 | 11/1975 | Wyczalek | 123/148 R X |

Primary Examiner—Ronald H. Lazarus
Attorney, Agent, or Firm—Kane, Dalsimer, Kane, Sullivan & Kurucz

[57] ABSTRACT

An internal combustion engine provided with a main combustion chamber, which is defined in the upper portion of a cylinder volume and has an intake valve and an exhaust valve, and a pre-combustion chamber free of an intake valve. In this internal combustion engine, the main combustion chamber is communicated by a passage with the pre-combustion chamber. The longitudinal axis of an ignition plug provided in the engine runs at a certain angle to that of said passage, the spark gap of the ignition plug being located within the passage thus permitting the combustion of a uniform, lean mixture and improving the ignitability thereof, while reducing the amount of harmful gas components contained in exhaust gas.

3 Claims, 9 Drawing Figures

INTERNAL COMBUSTION ENGINE PROVIDED WITH PRE-COMBUSTION CHAMBER

BACKGROUND OF THE INVENTION

1. Field of the Invention

This invention relates to an internal combustion engine which is provided with a main combustion chamber and a pre-combustion chamber to thereby permit the use of a lean mixture for the engine.

2. Description of the Prior Art

Hitherto, it is known to increase the fuel air ratio for a mixture to be supplied to an engine in an attempt to burn the lean mixture, thereby reducing the amounts of harmful gas components contained in exhaust gas from an internal combustion engine, such as carbon monoxide (CO), unburnt hydrocarbons (HC) and nitric oxide ($NO_x$). However, such lean mixture presents not only poor ignitability but also retarded combustion rate, thus impairing the efficiency of the engine as well as fuel consumption rate (g/ps.hr).

Known as one of the solutions to this problem is an internal combustion engine which is provided with a main combustion chamber and a pre-combustion chamber. The combustion chamber of the engine of this sort is divided into a main combustion chamber and a pre-combustion chamber which is communicated by a passage with the main combustion chamber, whereby a mixture introduced into the pre-combustion chamber is first ignited, after which the flame within the pre-combustion chamber is discharged into the main combustion chamber at a high speed through the passage, due to the increase in pressure resulting from the combustion of the mixture in the pre-combustion chamber. This causes to rapidly burn the mixture in the main combustion chamber to increase the combustion rate of the mixture within the main combustion chamber and, prevent the decrease in the efficiency of an engine.

However, such an attempt is plagued with another shortcoming in that, for achieving the aforesaid effects, the cross sectional area of said passage should be reduced to some extent, so that there results insufficient scavenging of the post-combustion gas from the pre-combustion chamber during the suction stroke, thus leaving residual post-combustion gas in the pre-combustion chamber. The residual post-combustion gas therein is compressed during the compression stroke of the main combustion chamber, and thus dilutes the mixture which is introduced from the main combustion chamber into the pre-combustion chamber. This apparently results in difficulties in ignition of the mixture within the pre-combustion chamber by means of the ignition plug.

To overcome this shortcoming, there have been proposed an attempt disclosed in SAE Paper No. 700491 eddited by SAE, in which a fuel injection nozzle is provided within the pre-combustion chamber to thereby provide a rich mixture therein, because of its good ignitability, and another attempt in which a subsidiary intake valve for admitting a mixture in the pre-combustion chamber is provided for the pre-combustion chamber, whereby a rich mixture, which is readily ignitable, is introduced through the subsidiary intake valve into the pre-combustion chamber. With those attempts, however, it is mandatory to supply two kinds of mixture having different fuel air ratios, with the results of complicated fuel supply system as well as difficulties in controlling fuel supply. In addition, this increases the manufacture cost of an engine.

SUMMARY OF THE INVENTION

It is accordingly a principal object of the present invention to provide an internal combustion engine provided with a pre-combustion chamber, which is simple in construction and easy in maintenance.

It is a further object of the present invention to provide an internal combustion engine provided with a pre-combustion chamber, which permits the combustion of a homogeneous lean mixture.

It is a still further object of the present invention to provide an internal combustion engine provided with a pre-combustion chamber, which presents an improved ignitability for a lean mixture charge.

It is a yet further object of the present invention to provide an internal combustion engine having a pre-combustion chamber, which reduces the concentration of the harmful gas components contained in exhaust gas from an engine.

According to the present invention, there is provided an internal combustion engine provided with a main combustion chamber which is defined in the upper portion of a cylinder volume and provided with an intake valve and an exhaust valve, and a pre-combustion chamber free of an intake valve, the main combustion chamber being communicated by a passage with the pre-combustion chamber, said pre-combustion chamber featuring that the longitudinal axis of an ignition plug provided in the engine runs at a certain angle to that of said passage, with the spark gap of the ingnition plug being located within the passage.

According to another aspect of the present invention, there is provided an internal combustion engine of the type defined, in which the angle formed by the longitudinal axis of the ignition plug and the axis of the passage is larger than 0° but not larger than 90°.

BRIEF DISCRIPTION OF THE DRAWINGS

Figure 4:
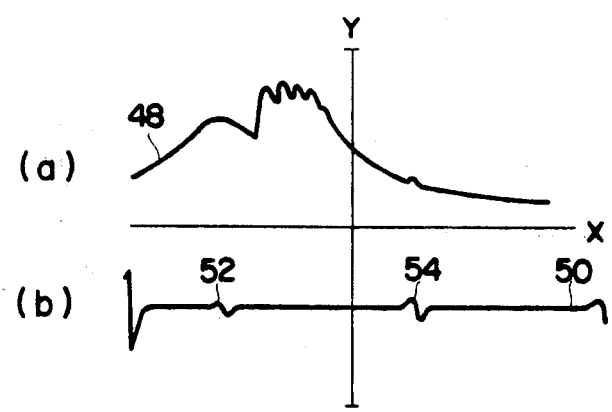
FIG. 4 is a plot illustrating the relationship between the position of a piston in a conventional internal combustion engine and the combustion pressure.
Figure 5:
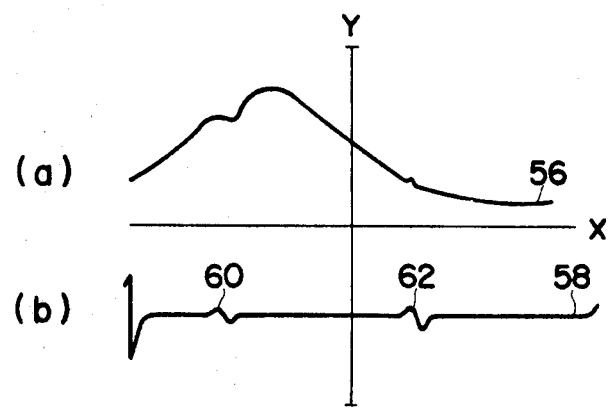
Figure 6:
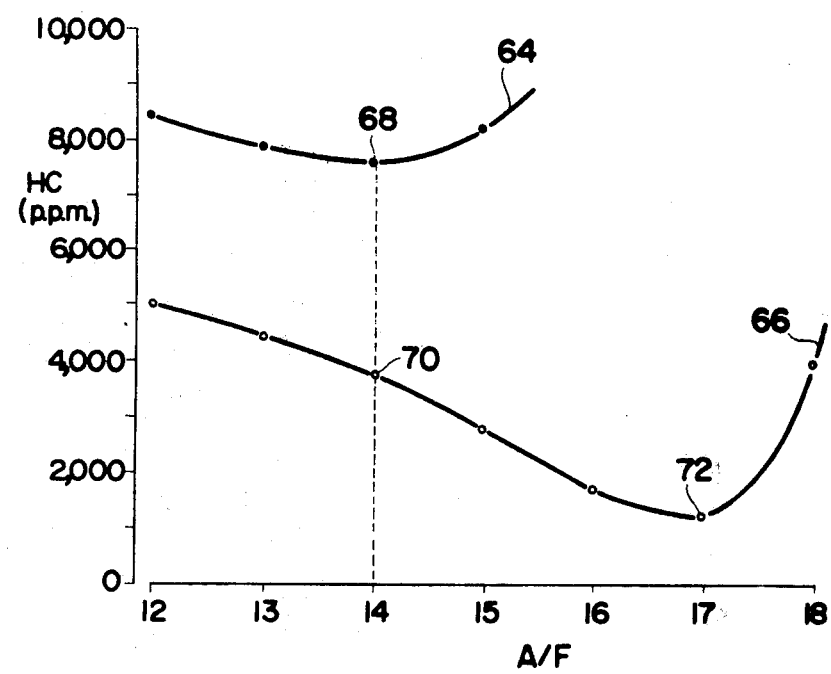

FIG. 5 is a plot similar to that shown in FIG. 4, illustrating the internal combustion engine according to the present invention; and FIG. 6 is a plot illustrating the relationship between the concentration of mixture to be fed to the internal combustion engine according to the present invention and to the conventional internal combustion engine, and the HC concentration in exhaust gases from the respective types of engines.

DESCRIPTION OF THE PREFERRED EMBODIMENTS

Figure 1:
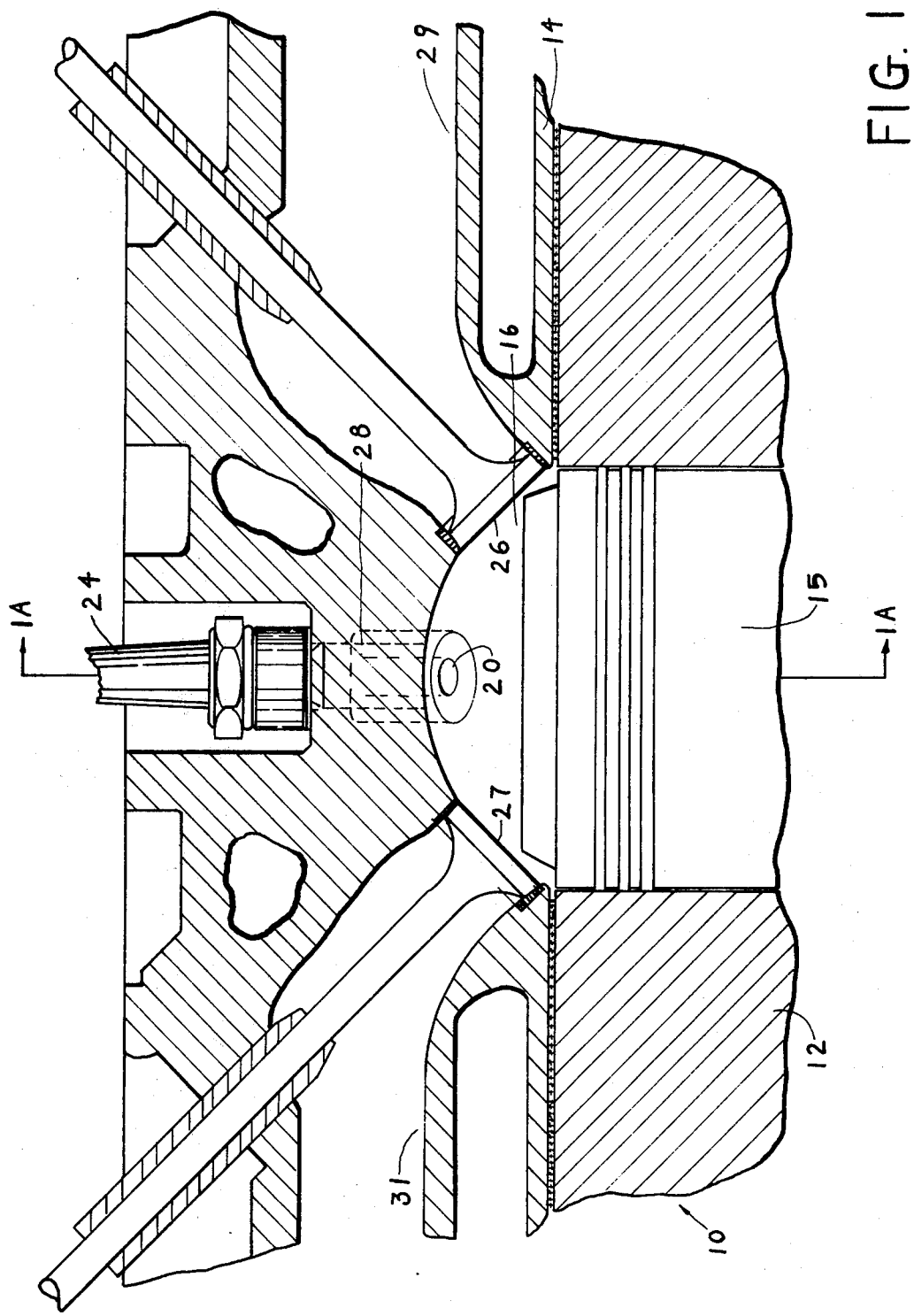
FIG. 1 is a longitudinal cross-sectional view showing part of an internal combustion engine according to the present invention.
Figure 1A:
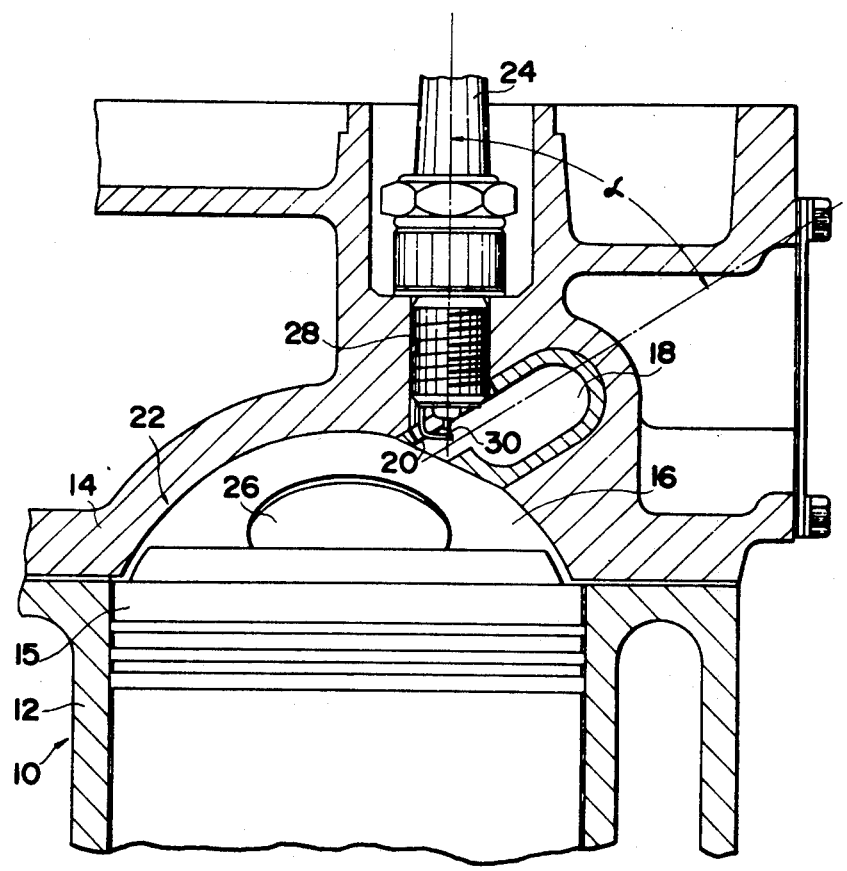
FIG. 1A is a cross-sectional view along line 1A—1A of FIG. 1.

Referring now to FIG. 1A, an internal combustion engine 10 includes an engine block 12, cylinder head 14, main combustion chamber 16 defined by the cylinder head 14 and the top face of a piston 15, a pre-combustion chamber 18 defined within the cylinder head, and a passage 20 communicating the main combustion chamber 16 with the pre-combustion chamber 18. A combustion chamber 22 consists of the main combustion chamber 16, pre-combustion chamber 18 and passage 20. In addition, the internal combustion engine 10 is provided with an ignition plug 24, intake valve 26 and exhaust valve (not shown). The piston 15, as in the same manner as the conventional internal combustion engine, is coupled to a crank shaft (not shown) by means of a connecting rod (not shown). A threaded hole 28 is provided in the cylinder head 14 for communicating the passage 20 with the exterior of the cylinder head 14. The ignition plug 24 is threaded into the threaded hole 28, with the spark gap 30 thereof being located within the passage 20.

Figure 7:
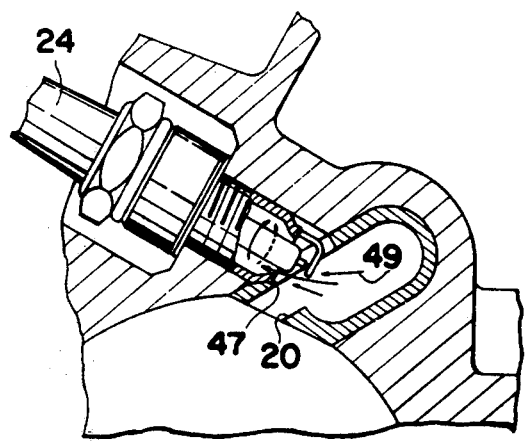

The longitudinal axis of said threaded hole 28, i.e., the longitudinal axis of the ignition plug when mounted therein runs at a certain angle $\alpha$ (FIG. 1A) to the direction of the fluid (mixture or combustion gas) flowing through the passage 20. Preferably, the angle $\alpha$ is in a range from several tens degrees to 90°, so that the attachment of the ignition plug may be facilitated. In case the angle $\alpha$ is zero, it is imperative to use an elongated ignition plug having its central electrode projecting into the pre-combustion chamber, so that a special technique for producing such an ignition plug has to be used. In addition, because the central electrode projects a large distance into the pre-combustion chamber, the central electrode is subjected to severe heating condition due to combustion. Moreover, because the central electrode is spaced apart from the threaded portion of the ignition plug, the heat dissipating characteristic is poor and thus the durability of the central electrode is materially impaired. On the other hand, in case the angle $\alpha$ exceeds 90°, then a combustion gas flowing at a high speed through the passage 20 as shown in FIG. 7 impinges upon one end 47 of the plug body of the ignition plug 24 on the grounding side thereof (FIG. 7), so that the combustion gas makes ingress into the interior of the ignition plug as shown by an arrow 49, thus heating the porcelain insulator and the plug body on the grounding side, severely, with the result of short durability of the ignition plug.

Figure 8:
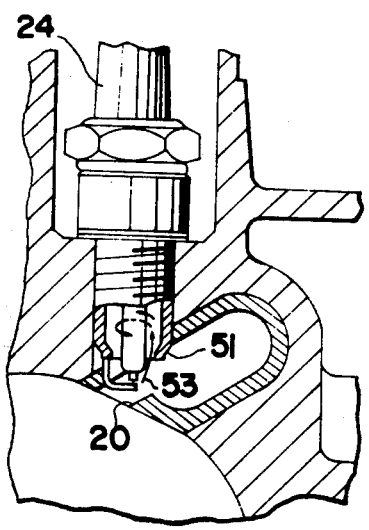

In contrast thereto, with the ignition plug positioned according to the present invention, the ignition plug is located at an angle of several tens degrees to the axis of said passage, with the spark gap being located within the passage, so that the ignition plug may be attached from the side of the passage 20, thus providing an ignition plug which is generally used as an ignition plug. In addition, in case the angle $\alpha$ is no more than 90°, the mixture flowing through the passage 20 during the compression stroke impinges on one end 51 of the plug body of the ignition plug on the grounding side, as shown in FIG. 8, so that the mixture charge enters the interior of the ignition plug as shown by an arrow 53, thus effectively cooling the porcelain insulator and the plug body on the grounding side around the central electrode of the ignition plug, while the combustion gases will not be introduced into the interior of the ignition plug at a high speed. This provides an ignition plug of a long durability or service life.

Referring now to FIG. 1, it may be seen that said angle $\alpha$ may be selected, depending on the attaching direction of the ignition plug and the position of the pre-combustion chamber plus the direction of the passage 20, within the allowable range of the angle $\alpha$. As shown in FIG. 1 there is an internal combustion chamber which, comprises a semi-spherical main combustion chamber 16 immediately above the cylinder volume, with the cylinders being arranged in series. The intake valve 26 and an exhaust valve 27 are arranged in directions to form a symmetric "V" pattern with respect to a row of cylinders for the purpose of increasing suction efficiency. Inlet valve 26 opens and closes communication between inlet port 29 and the chamber 16 while exhaust valve 27 opens and closes communication between exhaust port 31 and chamber 16. As is well known, the ignition position of the main combustion chamber 16 is located at the crest of the semi-spherical main combustion chamber 16, as shown, from the viewpoints of combustion efficiency. In addition, the passage 20 is directed such that the combustion gas blown through the passage 20 may reach throughout the main combustion chamber. Furthermore, in the case of said arrangement of the semi-spherical main combustion chamber having valves of a "V" direction, it is advantageous to attach the ignition plug into the engine from above, from viewpoints of maintenance of an engine.

For the above reasons, as best shown in FIG. 1A, the pre-combustion chamber 18 is located above the main combustion chamber 16 and off-set to the axis of the main combustion chamber 16, i.e., the axis of the cylinder, while the passage 20 is located, with its longitudinal axis being directed at an angle to that of the cylinder. In addition, the ignition plug 24 is provided in parallel with the axis of the cylinder of an engine, so that the longitudinal axis of the ignition plug 24 runs at a certain angle to that of the passage 20.

Figure 3:
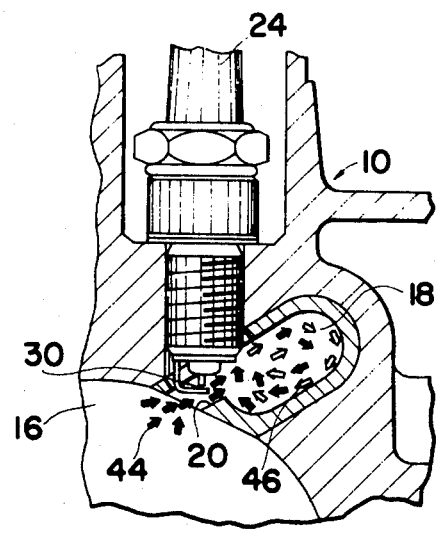
FIGS. 3, 7 and 8 are views similar to that shown in FIG. 2, illustrating the internal combustion engine according to the present invention.

During the suction stroke, due to the descending movement of the piston 15, a lean mixture is introduced through the intake valve 26. The mixture thus introduced is compressed during the ensuing compression stroke, followed by the introduction thereof from the main combustion chamber 16 through the passage 20 into the pre-combustion chamber 18, while compressing the residual post-combustion gas within pre-combustion chamber. At this time the post-combustion gases 46 dwelling within the passage 20 in the vicinity of spark gap 30 of the ignition plug 24, as shown in FIG. 3, are transported into the pre-combustion chamber 18 on the flow of the mixture charge. As a result, at the ignition time immediately before the completion of the compression stroke, the neighborhood of the spark gap 30 is filled with fresh mixture charge, so that it will not be diluted by post-combustion gas for ignition. Thus, the spark produced in the spark gap 30 readily ignites the mixture charge.

Figure 2:
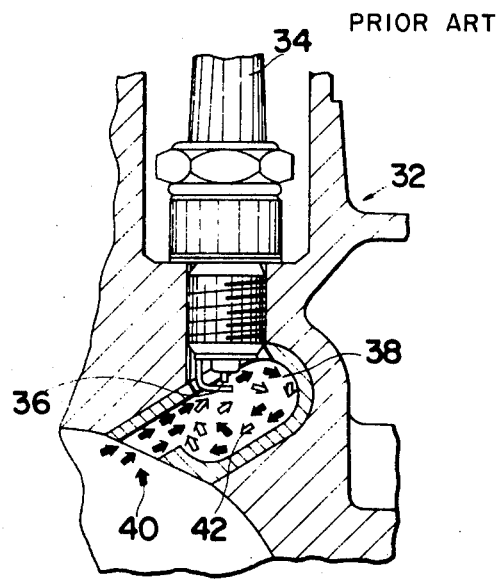
FIG. 2 is a longitudinal cross-sectional view showing part of the flow of a mixture in the vicinity of an ignition plug in a conventional type internal combustion engine.

With the internal combustion engine 32 having a conventional pre-combustion chamber as shown in FIG. 2, the spark gap 36 of the ignition plug 34 is located within the pre-combustion chamber 38, so that the post-combustion gas 42 residual within the pre-combustion chamber, which has been produced according to the previous combustion, as well as the fresh mixture charge 40 introduced through the passage 20 dwell in the pre-combustion chamber. Thus, the ignition is hindered by the post-combustion gas 42 therein.

When the mixture charge is ignited by means of the ignition plug 24 within the passage 20, the flame produced is propagated throughout the pre-combustion chamber 18 through the passage 20, so that the mixture charge within the pre-combustion chamber 18 is burned and thus the combustion gas at a high pressure and high temperature are produced within the pre-combustion chamber 18. The combustion gas at a high temperature and high pressure is blown through the passage 20 into the main combustion chamber 16 to agitate and ignite the mixture charge within the main combustion chmber for combustion. Since the mixture within the main combustion chamber 16 is attended with vigorous agitation and since a relatively lean mixture results, i.e., the mixture contains air of an amount greater than is required for combustion of the fuel, the fuel is burned completely, preventing the production of CO and HC which otherwise would be caused due to incomplete combustion. In addition, the air of a great amount lowers the combustion temperature, reducing the amount of $NO_x$ produced during the combustion stroke at a high temperature.

Graphs (a) shown in FIGS. 4 and 5 illustrate the combustion conditions of the conventional engine 32 and engine 10 according to the present invention, in terms of the measurements of combustion pressures prevailing in the combustion chambers of the engines, respectively. In those graphs, the abscissa X represents the angle 0 of a crank shaft and the positions of the piston within the combustion chamber, while the ordinate Y represents the pressure ($Kg/cm^2$) within said combustion chamber.

The curve 48 shown in FIG. 4(a) represents the variation in pressure within the combustion chamber during the operation of the conventional engine 32, while the curve 50 shown in FIG. 4(b) represents the positions of the crank shaft, i.e., the variation in the position of the piston associated therewith. Points 52 and 54 represent the top dead center and the bottom dead center, respectively. As is best shown by the curve 48, the internal pressure within the combustion chamber of the conventional engine 32 gives considerable fluctuation, thus representing the inconsistent combustion condition. In contrast thereto, the variation in the pressure within the combustion chamber of the engine according to the present invention is represented by a relatively smooth curve 56, representing consistent combustion. The curve 58 shown in FIG. 5(b) represents the variation in the position of the piston as in the case with FIG. 4(b), while the points 60 and 62 represent the top dead center and the bottom dead center, respectively.

FIG. 6 shows the relationship between the concentration of a mixture charge to be supplied to the combustion engine at the time of idle running of an engine, i.e., the fuel-air ratio (the amount of air introduced versus introduced fuel) and HC gas concentration (p.p.m.) contained in exhaust gas from an engine. The curve 64 and curve 66 show the characteristics of the engines of the conventional type and according to the present invention, respectively. As shown at the point 68, the engine of a conventional type exhausts gas containing the minimum amount of HC of about 8000 p.p.m. at the fuel air ratio of about 14 of the mixture charge supplied. On the other hand, the engine 10 according to the present invention exhausts gas containing HC of an amount half that of the conventional type engine 32, i.e., 4000 p.p.m., in case the mixture charge at the fuel air ratio of 14 is supplied to the engine as shown at the point 70. On the other hand, as shown at the point 72, in case the mixture charge at the fuel air ratio of about 17 is supplied, the amount of HC exhibits the minimum amount of about 1000 p.p.m.

As is apparent from the foregoing description of the engine having a pre-combustion chamber according to the present invention, there may be achieved combustion of a homogeneous lean mixture charge, with the results of improved ignitability and stable combustion condition, thus reducing the concentration of the detrimental gas components contained in exhaust gas.

In addition, according to the present invention, there may be achieved an engine which may use the ignition plug of the conventional type and which is simple in construction and easy in manufacture and maintenance.

What is claimed is:

1. In an internal combustion engine provided with a main combustion chamber which is defined in the upper portion of a cylinder volume and provided with an intake valve for introducing a lean mixture into said main combustion chamber and an exhaust valve and a pre-combustion chamber free of an intake valve, said main combustion chamber being communicated by a passage with said pre-combustion chamber, an ignition plug provided in said engine, said ignition plug having a spark gap, the improvement which comprises; having said spark gap located within said passage, the central axis of the passage being off-set relative to the longitudinal central axis of the pre-combustion chamber so that the longitudinal central axis of the pre-combustion chamber is asymmetrical with respect to the longitudinal central axis of the passage, whereby said lean mixture pressed into said pre-combustion chamber through said passage is ignited by said spark plug, and blowing as a torch flame from said pre-combustion chamber into said main combustion chamber.

2. An internal combustion engine as set forth in claim 1, having the further improvement which comprises; the positioning of said ignition plug so the angle formed by the longitudinal axis of said ignition plug and the longitudinal axis of said passage is larger than 0° but not larger than 90°.

3. An internal combustion engine provided with at least one semi-spherical main combustion chamber defined immediately above a cylinder volume and provided with an intake valve for introducing a lean mixture into said main combustion chamber and an exhaust valve, said intake and exhaust valves being arranged in direction to form a substantial V pattern, wherein at least one pre-combustion chamber having no intake valve is located above said main combustion chamber and off-setted to the axis of said cylinder said pre-combustion chamber being communicated by a passage with said main combustion chamber, and wherein an ignition plug, with a spark gap thereof located within said passage, is provided to be substantially parallel to the axis of said cylinder, the longitudinal central axis of the passage being off-set relative to the longitudinal central axis of the precombustion chamber so that the longitudinal central axis of the pre-combustion chamber is asymmetrical with respect to the longitudinal central axis of the passage, whereby said lean mixture pressed into said pre-combustion chamber through said passage is ignited by said spark plug, and blowing as a torch flame from said pre-combustion chamber into said main combustion chamber.

* * * * *